(12) United States Patent
Aizaki

(10) Patent No.: US 7,020,945 B2
(45) Date of Patent: Apr. 4, 2006

(54) METHODS FOR ADJUSTING CLEARANCE

(75) Inventor: Jiro Aizaki, Toyota (JP)

(73) Assignee: Araco Kabushiki Kaisha, Aichi-Ken (JP)

( * ) Notice: Subject to any disclaimer, the term of this patent is extended or adjusted under 35 U.S.C. 154(b) by 243 days.

(21) Appl. No.: 10/691,914

(22) Filed: Oct. 23, 2003

(65) Prior Publication Data

US 2004/0134055 A1    Jul. 15, 2004

(30) Foreign Application Priority Data

Oct. 31, 2002 (JP) ............... 2002-318575
Sep. 10, 2003 (JP) ............... 2003-318227

(51) Int. Cl.
*G01M 19/00* (2006.01)
(52) U.S. Cl. ............... 29/407.09; 29/407.05
(58) Field of Classification Search ........... 29/407.09, 29/407.05, 407.01
See application file for complete search history.

(56) References Cited

U.S. PATENT DOCUMENTS 5,775,212 A * 7/1998 Takao ............... 100/214
6,220,666 B1   4/2001 Ohya

FOREIGN PATENT DOCUMENTS

JP    4-102417    9/1992
JP    2000-153327   6/2000

* cited by examiner

*Primary Examiner*—John C. Hong
(74) *Attorney, Agent, or Firm*—Patterson, Thuente, Skaar & Christensen, P.A.

(57) ABSTRACT

A method for setting a clearance (G) between a sliding member (36) and a guide member (30) may includes the steps of determining the clearance (G), changing the clearance by utilizing a working means, and stopping the working means when the determined clearance (G) reaches a predetermined target clearance (Gt).

8 Claims, 6 Drawing Sheets

METHODS FOR ADJUSTING CLEARANCE

This application claims priority to Japanese Patent Application Serial Numbers 2002-318575 and 2003-318227, the contents of which are incorporated herein by reference.

BACKGROUND OF THE INVENTION

1. Field of the Invention

The present invention relates to methods and apparatus for adjusting a clearance between a sliding member and a guide member (e.g., a sliding pawl and a guide member that constitute a locking means of a seat reclining mechanism).

2. Description of the Related Art

A method for adjusting a clearance between a sliding member and a guide member is taught, for example, by Japanese Laid-open Patent Publication Number 2000-153327, in which a sliding pawl and a pair of (first and second) guide blocks that constitute a locking means of a seat reclining mechanism is exemplified as a sliding member and a guide member. In this known art, the sliding pawl that is previously heated to a desired temperature is received between the guide blocks. Thereafter, the first guide block is worked or deformed by means of a punch while the sliding pawl is moved or slid along the second guide block, thereby reducing a clearance between the first guide block and the sliding pawl. The first guide block is deformed until the clearance is very small or zero. The sliding pawl is then cooled and contracted, thereby increasing the clearance. Thus, the clearance is appropriately adjusted.

However, this method relies upon a coefficient of thermal expansion or contraction of the sliding pawl. Therefore, it is difficult to precisely control the clearance.

SUMMARY OF THE INVENTION

It is one object of the present teachings to provide improved methods and apparatus for adjusting a clearance between a sliding member and a guide member.

For example, in one aspect of the present teachings, a method for setting a clearance between a sliding member and a guide member may includes the steps of determining the clearance, changing the clearance by utilizing a working means, and stopping the working means when the determined clearance reaches a predetermined target clearance.

According to this method, an operation for changing the clearance between the sliding member and the guide member may preferably be carried out while monitoring the clearance. Therefore, the clearance can be quickly and strictly adjusted. In addition, it is not necessary to previously treat (e.g., preheat) the sliding member for adjusting the clearance.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

A detailed representative embodiment of the present teachings is shown in FIGS. 1 to 9.

Figure 5:
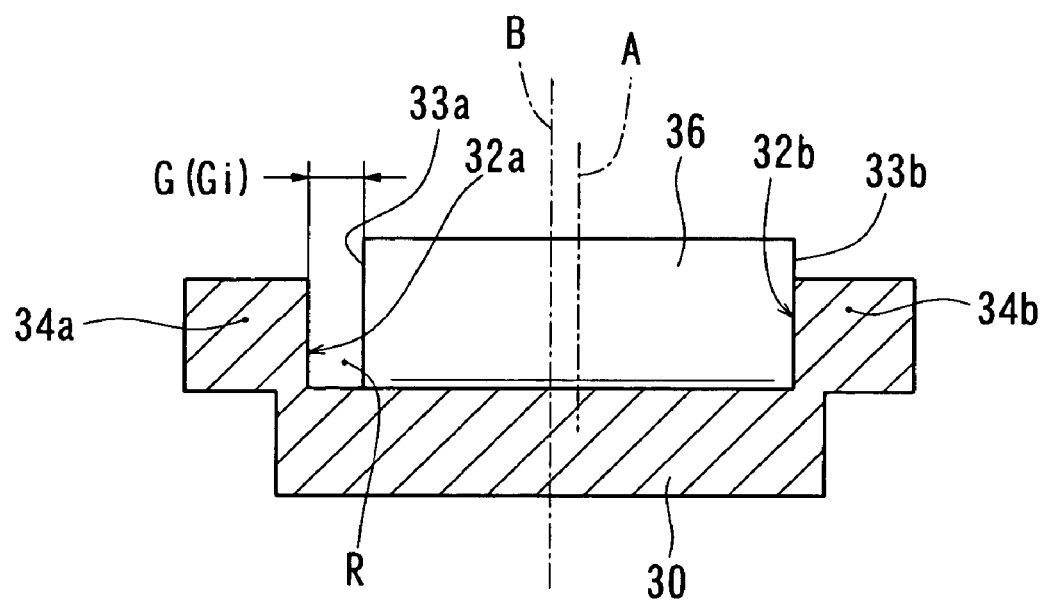
FIG. 5 is an explanatory cross-sectional view of the sliding member and the guide member in which the clearance is not reduced.

In the representative embodiment, a subject to be worked or processed is a product as shown in FIG. 5. The product includes a guide member 30 and a sliding member 36. The guide member 30 and the sliding member 36 may preferably be press formed articles (metal). Further, an example of the sliding member 36 and the guide member 30 may be a sliding pawl and a housing that constitute a locking means of a seat reclining mechanism. A relevant seat reclining mechanism is found in U.S. patent Ser. No. 10/385,201, the contents of which are hereby incorporated by reference.

Figure 1:
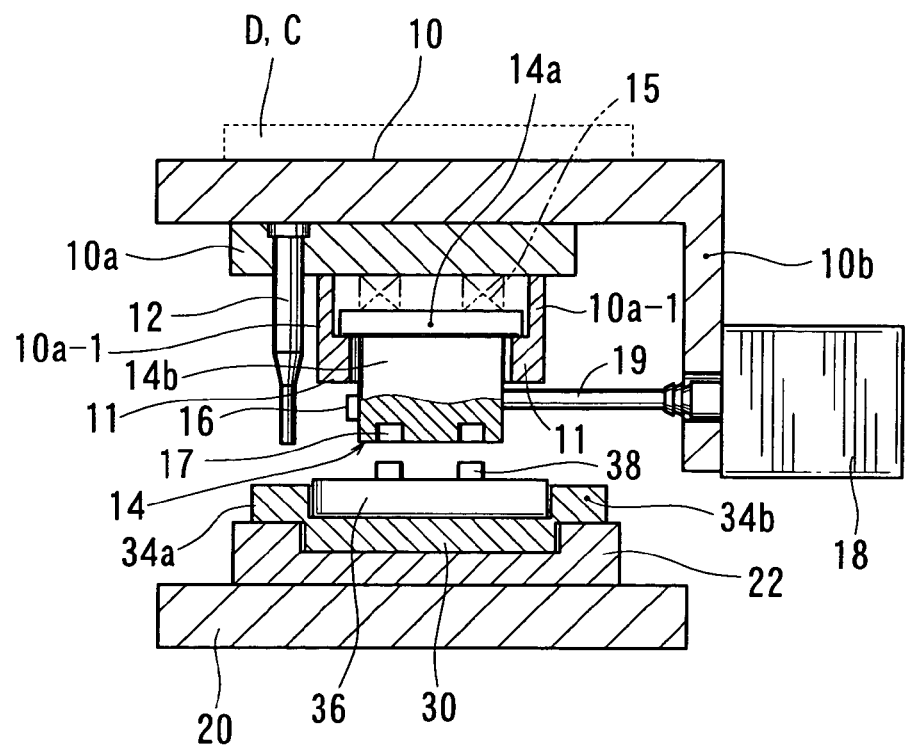
FIG. 1 is a vertical, cross-sectional view of an apparatus for adjusting a clearance between a sliding member and a guide member according to one representative embodiment of the present teachings.

The guide member 30 comprises a pair of (first and second) guide walls 34a and 34b each having opposed (first and second) guide surfaces 32a and 32b, which define a guide groove R therebetween. The sliding member 36 has opposed (first and second) side surfaces 33a and 33b and is slidably received in the groove R, so as to move along the guide surfaces 32a and 32b of the guide walls 34a and 34b. The sliding member 36 is preferably dimensioned such that a clearance G is defined between the first guide surface 32a and the first side surface 33a when the second guide surface 32b contacts the second side surface 33b. The clearance G as originally defined is hereinafter referred to as "an initial clearance Gi." As will be appreciated, the initial clearance Gi is set to a relatively large dimension such that the sliding member 36 can be easily assembled to the guide member 30. Therefore, after the sliding member 36 is assembled to the guide member 30, the clearance G (the initial clearance Gi)

is appropriately adjusted or reduced to a desired clearance (FIG. 6), so that the sliding member 36 can be smoothly slid within the guide groove R of the guide member 30 without rattling. Such a desired clearance corresponds to "a design clearance" of the product, which is hereinafter referred to as "a target clearance Gt." In addition, as best shown in FIG. 1, the sliding member 36 may preferably be formed with a pair of upper projections 38, which function as an engagement means (which will be hereinafter described).

A representative apparatus for changing or reducing the clearance G to the target clearance Gt will now be described.

As shown in FIGS. 1–4, the apparatus may preferably be exemplified as a press molding machine and may include an upper die assembly that can move with respect to a lower die assembly. The upper die assembly of the apparatus may include an upper die 10 having a side bracket 10b, a punch holder 10a that is attached to a lower surface of the upper die 10, a pair of opposed attachment holders 10a-1 that are positioned in a spaced relationship and are suspended from the punch holder 10a, a downwardly projected punch 12 (i.e., working means) that is supported by the punch holder 10a, and an attachment 14 held by and suspended from the attachment holders 10a-1. Preferably, the punch 12 is integral with the upper die 10, so as to move therewith. The attachment 14 has an upper flanged portion 14a and a lower attachment body 14b. The attachment holders 10a-1 have lower shouldered portions 11. The attachment 14 is positioned between the attachment holders 10a-1, so that the upper flanged portion 14a engages the shouldered portions 11. Thus, the attachment 14 is supported by and suspended from the attachment holders 10a-1. As apparent from the drawings, the upper flanged portion 14a may preferably have a width smaller than a distance between the attachment holders 10a-1. Similarly, the lower attachment body 14b may preferably have a width smaller than a distance between the shouldered portions 11. As a result, the attachment 14 may preferably be laterally and vertically movable. In addition, a desired number of springs 15 are interleaved between the punch holder 10a and the upper flanged portion 14a, so that the attachment 14 can be normally downwardly forced. Further, the attachment body 14b has a pair of recessed portions 17 that are formed in a lower surface thereof. As will be recognized, the recessed portions 17 may preferably be arranged and shaped to engage the upper projections 38 of the sliding member 36.

The upper die assembly of the apparatus may further include a vibration generator 18 (i.e., vibration generating means) that is attached to the side bracket 10b of the upper die 10. The vibration generator 18 has a vibration transmitting rod 19 that laterally extends therefrom. The rod 19 may preferably be connected to the attachment body 14b, so that the attachment 14 can be periodically reciprocally moved or vibrated in a direction intersecting the clearance G when the vibration generator 18 is actuated. Moreover, the upper die assembly may include a vibration sensor or accelerometer 16 (i.e., acceleration measuring means) for detecting vibration levels of the attachment 14. The accelerometer 16 may preferably be attached to the attachment body 14b. Also, the accelerometer 16 is electrically connected to a processor C (i.e., processing means), which includes a control circuit (i.e., controlling means). The processor C is electrically connected to a drive unit D (i.e., drive means).

The lower die assembly of the apparatus may include a lower die 20, and a product holder 22 that is attached to an upper surface of the lower die 20. As will be appreciated, the product holder 22 is arranged and constructed such that the product (the guide member 30 and the sliding member 36) can be preferably supported or retained thereon.

Figure 2:
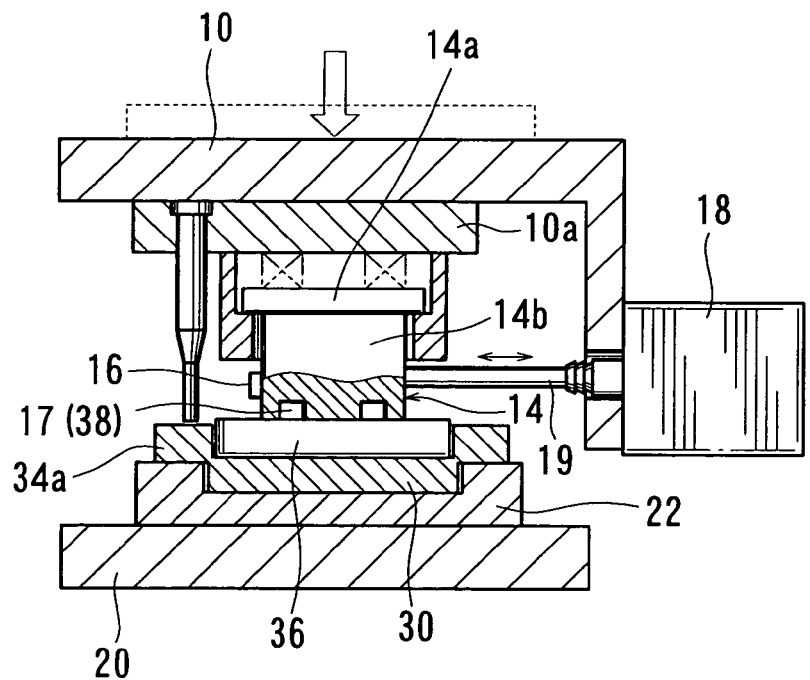
FIG. 2 is a vertical, cross-sectional view of the apparatus, which view illustrates a condition that a vibration generator is actuated.

A representative method for adjusting the clearance G to the target clearance Gt using the apparatus will now be described. First, the sliding member 36 is assembled to the guide member 30, thereby forming the product as a unit. Thereafter, as shown in FIG. 1, the upper die 10 is first lifted up to an uppermost position and the product thus formed is disposed on the product holder 22 of the lower die 20. Subsequently, the upper die assembly is actuated by the drive unit D and is lowered until the recessed portions 17 of the attachment 14 engage the upper projections 38 of the sliding member 36. As shown in FIG. 2, when the attachment 14 is integrated with the sliding member 36 by engagement of the recessed portions 17 and the projections 38, the vibration generator 18 is actuated, so that the attachment 14 can be laterally periodically vibrated via the vibration transmitting rod 19. As a result, the sliding member 36 can also be synchronously vibrated, so that the first and second side surfaces 33a and 33b thereof may preferably periodically and alternately contact the first and second guide surfaces 32a and 32b of the guide walls 34a and 34b, respectively.

Figure 3:
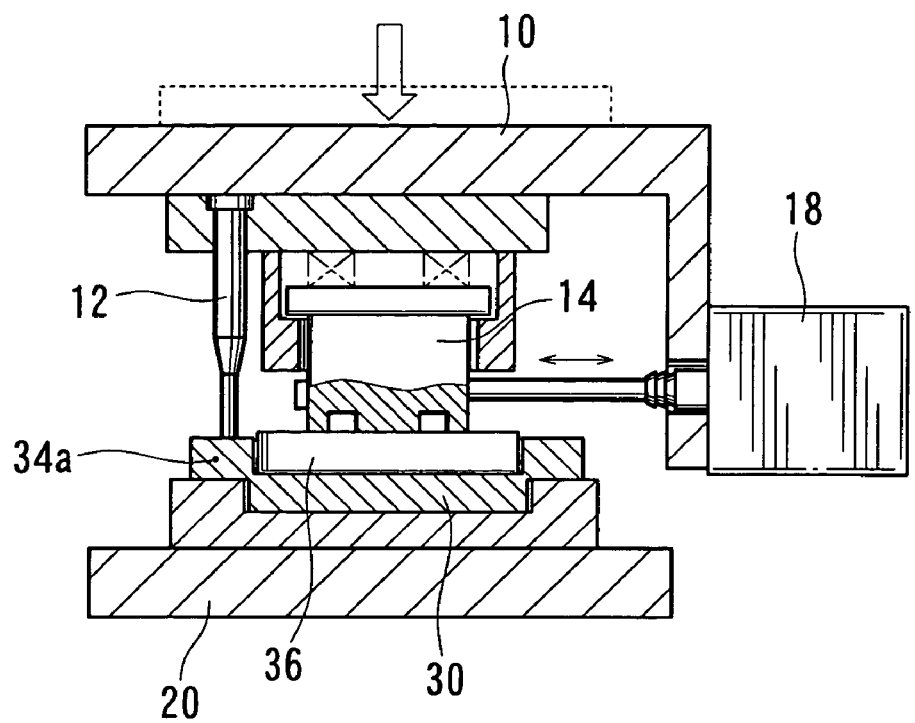
FIG. 3 is a vertical, cross-sectional view of the apparatus, which view illustrates a condition that an upper die is also actuated.
Figure 4:
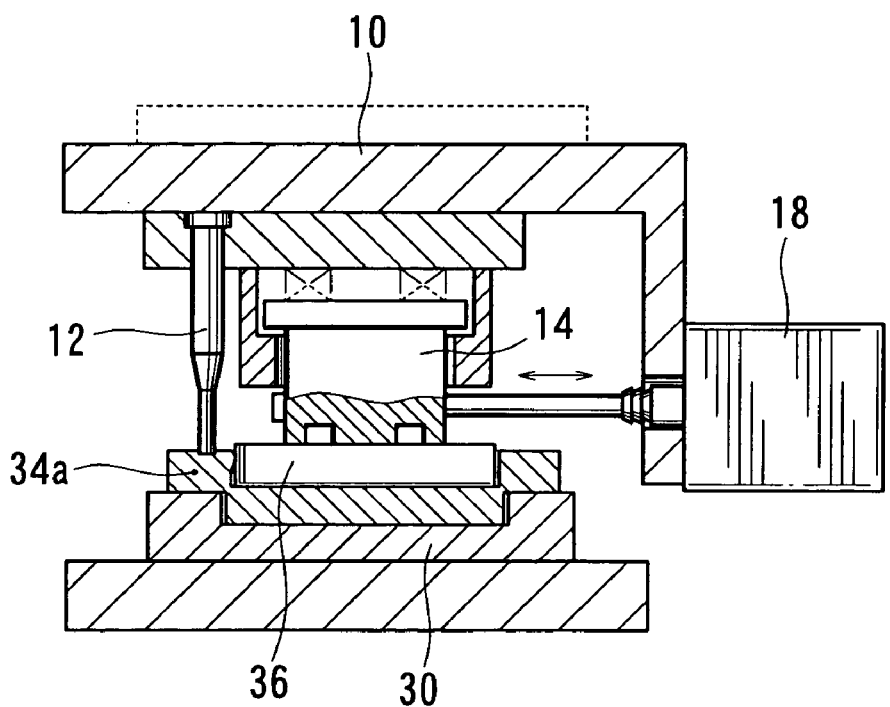
FIG. 4 is a vertical, cross-sectional view of the apparatus, which view illustrates a condition that a clearance adjusting process is completed.
Figure 6:
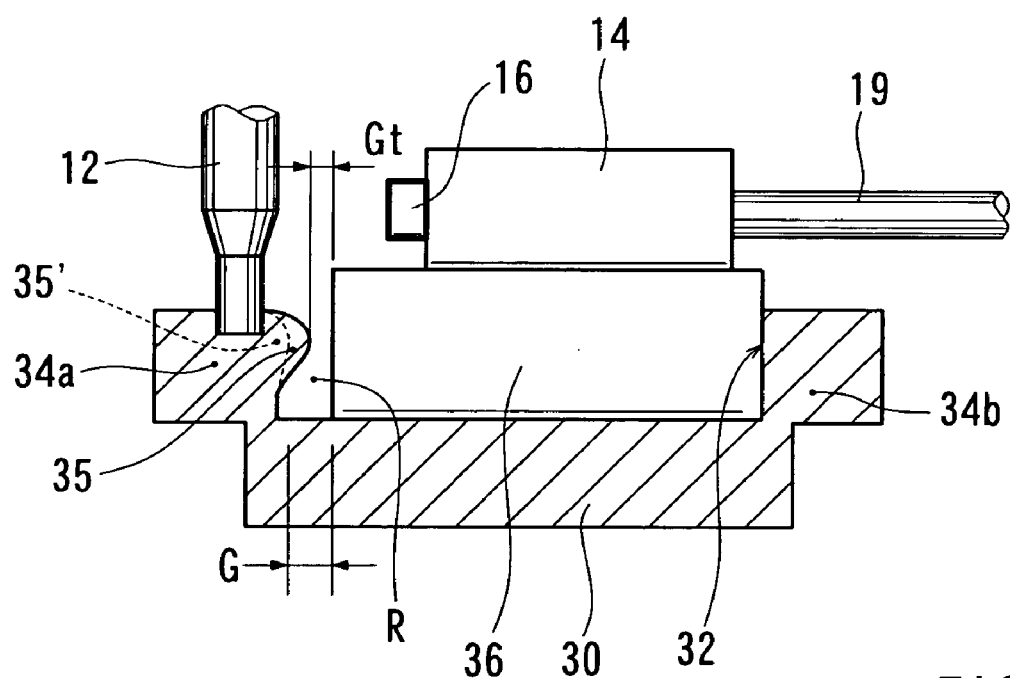
FIG. 6 is a partially enlarged view of the apparatus shown in FIG. 4 in which the clearance is reduced.

As shown in FIG. 3, the upper die assembly is further lowered while the vibration generator 18 is successively actuated. At this time, the punch 12 may press an upper surface of the first guide wall 34a of the guide member 30, thereby inducing plastic flow caused by plastic deformation in the first guide wall 34a. As a result, as best shown in FIG. 6, the first guide wall 34a may preferably be deformed, thereby producing a protuberance 35' that projects into the groove R, as shown by a broken line. Thus, the clearance G may preferably be gradually reduced.

The upper die assembly is successively lowered until the clearance G is reduced to the target clearance Gt (i.e., until the protuberance 35' is grown to a desired protuberance 35, as shown by a solid line in FIG. 6). When the clearance G reaches the target clearance Gt, the upper die assembly is stopped, thereby terminating the pressing operation of the punch 12.

As will be appreciated, in order to accurately control the upper die assembly, the clearance G must be continuously measured and monitored. However, in this embodiment, the clearance G is not directly measured. Instead, "changes of acceleration" of the vibrating sliding member 36 (the vibrating attachment 14) are determined and "a special value" obtained therefrom is used as representative of the clearance G.

When the first guide wall 34a of the guide member 30 is pressed while vibrating the sliding member 36, the clearance G is gradually reduced and as a result, the acceleration of the sliding member 36 (the attachment 14) is changed. The accelerometer 16 continuously measures the acceleration of the sliding member 36 in time series and sends corresponding signals to the processor C. The processor C may preferably produce a vibration waveform corresponding to the measured acceleration, as shown by a solid line in FIG. 8. Such a waveform is hereinafter referred to as "an actual vibration waveform W." Further, a reference X in FIG. 8 shows "an original vibration waveform" generated by the vibration generator 18.

Figure 8:
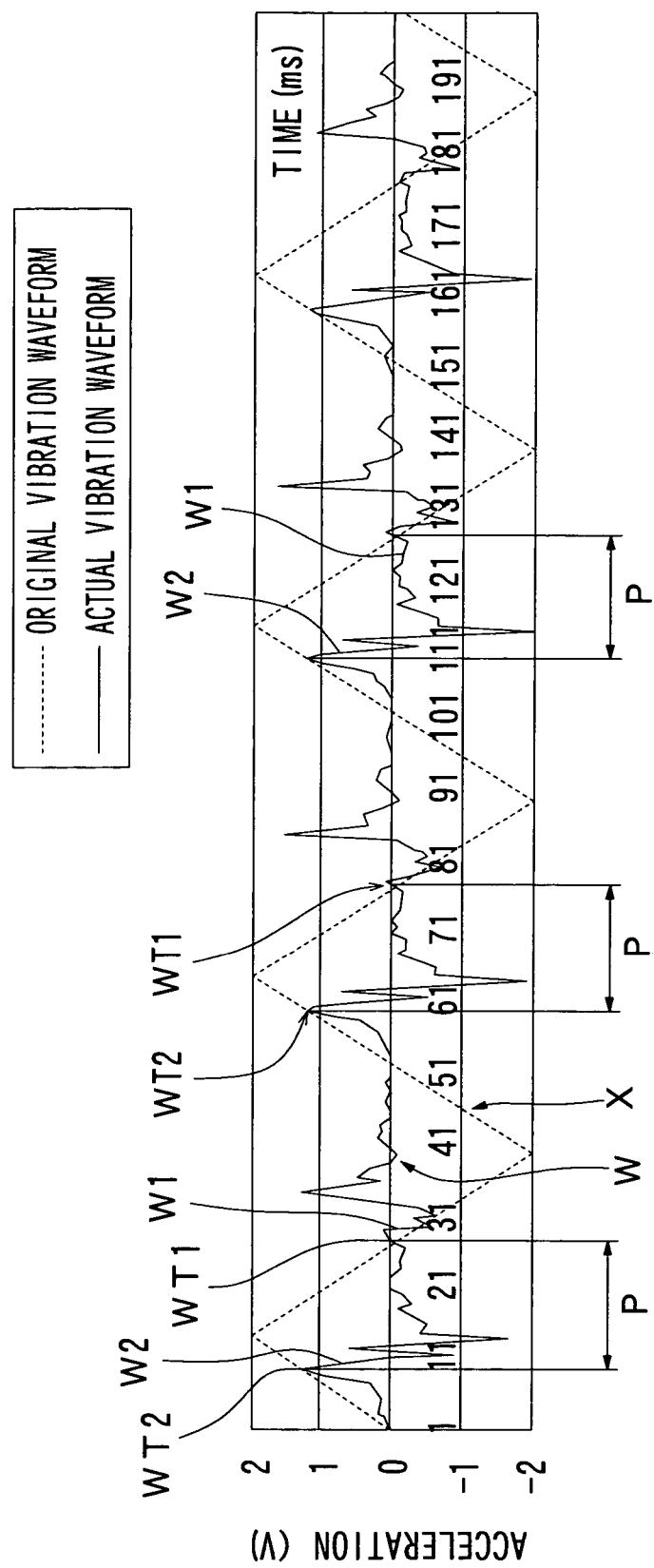
FIG. 8 is a graph illustrating an original vibration waveform generated from the vibration generator and an actual vibration waveform of the sliding member.

Typically, as shown in FIG. 8, the actual vibration waveform W thus produced includes fixed waveform portions W1 that are not substantially affected by the clearance G, and variable waveform portions W2 that are directly affected by the clearance G. As will be recognized, generating positions of the fixed waveform portions W1 substantially depend on the original vibration waveform X, whereas generating positions of the variable waveform portions W2 do not depend on the original vibration waveform X and may change based on the changes of the clearance G. The variable waveform portions W2 are periodically produced when the side surfaces 33a and 33b of the sliding member 36 contacts the guide surfaces 32a and 32b of the guide member 30. As will be appreciated, the shape of the variable waveform portions W2 may change with time because the clearance G is changed or reduced with time.

Figure 7:
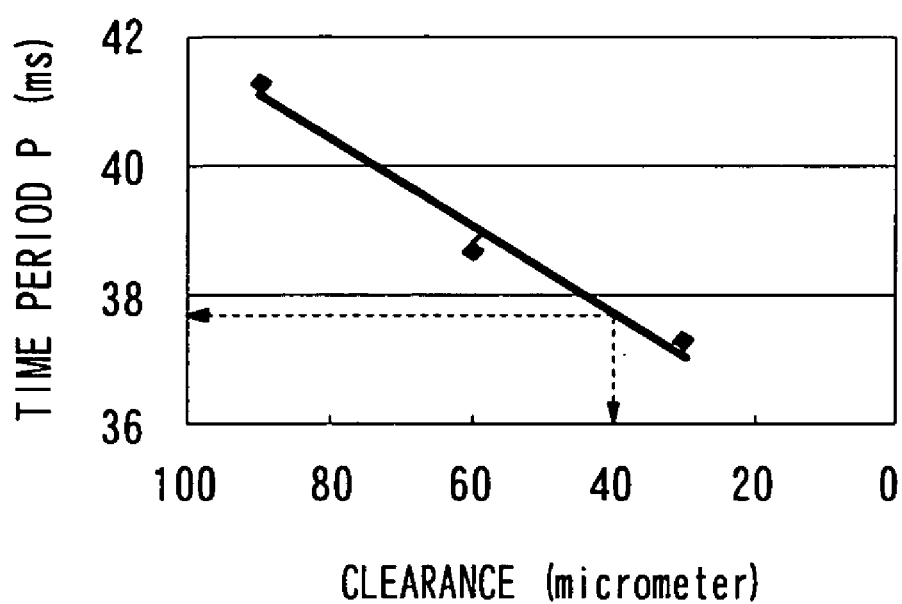
FIG. 7 is a graph of the clearance against a special time period in which the time period values are mathematically processed by a least-squares method.

In view of the direct relationship between the actual vibration waveform W and the original vibration waveform X, in this embodiment, a special time period P is selected as representative of the clearance G. As shown in FIG. 7, there is a reasonable correlation between the time period P and the clearance G. Further, in FIG. 7, values of the time period P are mathematically processed by a least-squares method. Therefore, the time period P corresponding to the target clearance Gt (which will be hereinafter referred to as a target time period Pt) may preferably be easily determined from the graph shown in FIG. 7. The target period Pt determined from FIG. 7 may preferably be used as a threshold value (setting value) for controlling (stopping) the upper die assembly. As will be apparent from FIG. 7, when the target clearance Gt is set at 40 micrometer, the target period Pt may be 37.8 millisecond (ms).

The values of the time period P can be determined by the following equation:

$$P = WT1 - WT2$$

wherein WT2 (i.e., a first time) corresponds to a time when the variable waveform portion W2 is peaked, and WT1 (i.e., a second time) corresponds to a time when the fixed waveform portion W1 equals to zero. Typically, WT2 may be defined as a time when the acceleration in the fixed waveform portion W1 is maximized. On the other hand, WT1 may be defined as a time when the acceleration in the fixed waveform portion W1 is first reversed (i.e., plus to minus or minus to plus) after WT2. Further, WT1 and WT2 are not necessarily read from the graph shown in FIG. 8. That is, WT1 and WT2 can be determined by dividing the vibration wave form W in time sequence into a high-frequency band and a low-frequency band by Fourier transformation.

As will be recognized, the time period P will substantially correspond to a time difference between a time when the side surface 33a of the sliding member 36 contacts the guide surface 32a of the guide member 30 and a time when the side surface 33b of the sliding member 36 contacts the guide surface 32b of the guide member 30. Also, the time period P will substantially correspond to a time difference between a time when a center line A of the sliding member 36 aligns with a centerline B of the guide groove R of the guide member 30 and a time when the center line A of the sliding member 36 again aligns with the centerline B of the groove R. Further, the time period P can be periodically determined once every 0.05 seconds if the vibration generator 18 generates vibrations of 20 Hz.

Figure 9:
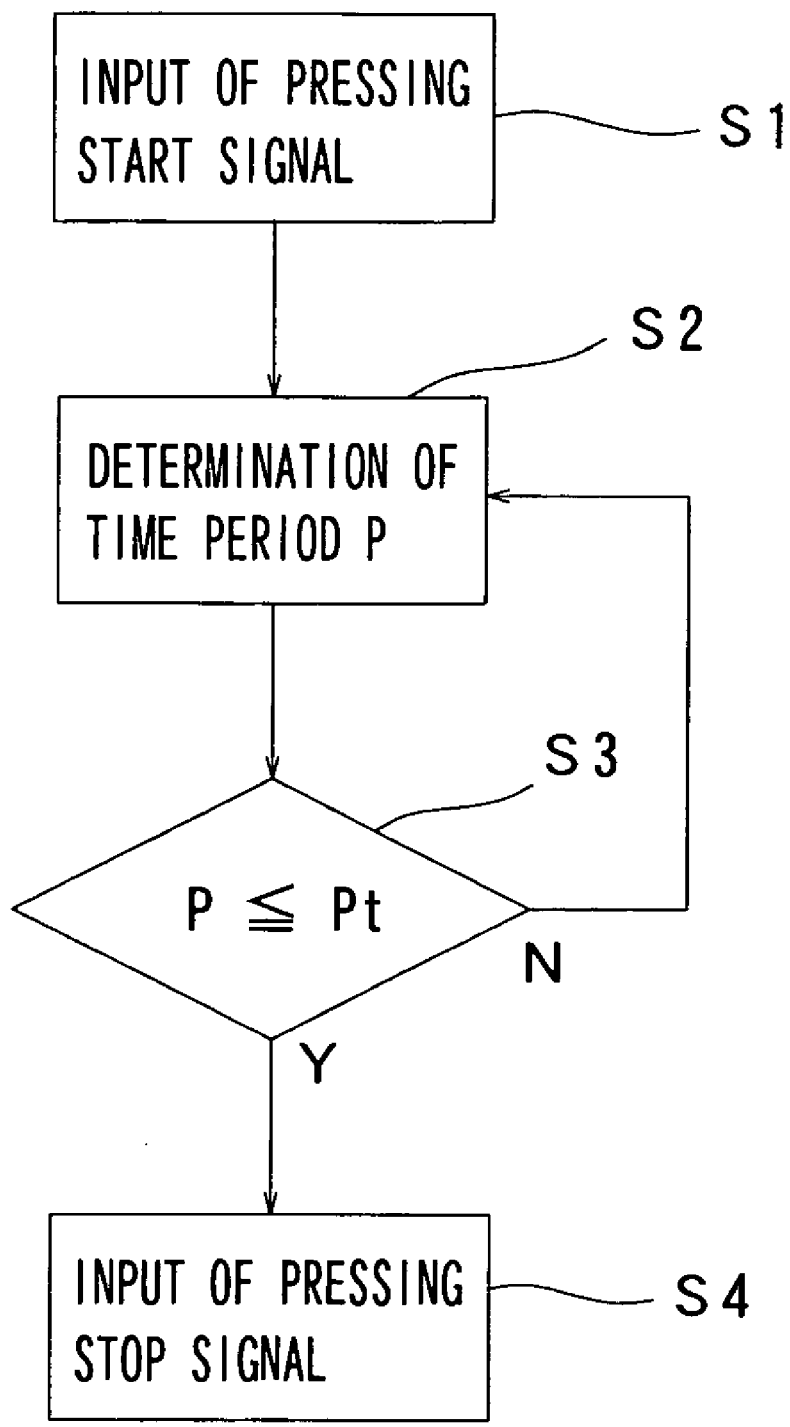
FIG. 9 is a block diagram illustrating an upper die controlling process of a processing means.

The upper die assembly may preferably be controlled by monitoring the values of the time period P. As shown in FIG. 9, in step S1 the processor C (FIG. 1) transmits a pressing start signal to the apparatus, thereby moving (lowering) the upper die assembly so that the pressing operation of the apparatus is started. Thereafter, in step S2 the time period P is determined (preferably, once every 0.05 seconds). In step S3, the processor C determines if the determined time period P is not greater than the target period Pt (i.e., the setting value). If the determined time period P is not greater than the target period Pt, in step S4 the processor C transmits a pressing stop signal to the apparatus, thereby immediately stopping the upper die assembly. Thus, the adjusting operation of the clearance G is completed. On the contrary, if the determined time period P is still greater than the target period Pt, the pressing operation is continued while another time period P is determined.

According to the present method, because the time period P is used as representative of the clearance G, it is possible to set the target clearance Gt over a wide range as well as to strictly control the set target clearance Gt. In addition, it is possible to reduce the clearance G of about 0.13 mm to the target clearance Gt of about 0.03 mm. As a result, the present method can be applied to sliding pawl and housing assemblies of various types of locking mechanisms.

In the representative embodiment, although the time period P is selected as the value representative of the clearance G, another time periods can be used as the value representative of the clearance, if desired, provided that graphs similar to FIG. 7 can be obtained. Examples of such time periods may be a time difference between WT1 and subsequent WT2 or other such time difference.

Further, in the representative embodiment, the sliding member 36 is vibrated within the guide groove R of the guide member 30 and the acceleration of the sliding member 36 is measured instead of directly measuring clearance G. However, it is possible to directly measure the clearance G by utilizing an optical measuring method, an image analyzing method or other such methods, if desired. In the optical measuring method, a predetermined light beam amount is emitted into the clearance G and the amount of light passing through the clearance G is periodically measured, thereby preparing a graph of the clearance G against the amount of light passing through the clearance G. The graph thus prepared is similar to the graph shown in FIG. 7 because the amount of light passing through the clearance G may generally change in proportion to the clearance G. The clearance G can be determined from this graph. Also, in the image analyzing method, the clearance G is periodically photographed. The clearance G can be directly determined from the photographed data thus obtained without preparing a graph corresponding to FIG. 7. Values of the clearance G thus obtained can be used for controlling the upper die assembly.

The invention claimed is:

1. A method for setting a clearance between a sliding member and a guide member, comprising the steps of:
    determining the clearance, wherein the step of determining the clearance comprises reciprocally moving the sliding member in a direction intersecting the clearance, measuring an acceleration of the sliding member in time series, determining a special time period from changes of the measured acceleration and using the time period as a representative of the clearance;
    changing the clearance by utilizing a working means; and
    stopping the working means when the determined clearance reaches a predetermined target clearance.

2. A method as defined in claim 1, wherein the special time period corresponds to a time period between a time when the sliding member contacts the guide member and a time when the sliding member again contacts the guide member.

3. A method as defined in claim 1, wherein the sliding member is received in a guide groove of the guide member, and wherein the special time period corresponds to a time period between a time when a center line of the sliding member aligns with a centerline of the guide groove of the guide member and a time when the center line of the sliding member again aligns with the centerline of the groove.

4. A method as defined in claim 1, wherein the special time period comprises a desired time period obtained from a graph of the measured acceleration against time.

5. A method as defined in claim 4, wherein the graph includes a fixed portion and a variable portion, and wherein the time period is defined as a time difference between a first time in the variable portion and a second time in the fixed portion.

6. A method as defined in claim 5, wherein the first time corresponds to a time when the variable portion is peaked, and wherein the second time corresponds to a time when the fixed waveform portion is first reversed after the first time.

7. A method as defined in claim 1, wherein the step of changing the clearance comprises reducing the clearance.

8. A method as defined in claim 7, wherein the step of reducing the clearance is performed by pressing the guide member.

* * * * *